(12) United States Patent
Zen

(10) Patent No.: US 6,478,215 B2
(45) Date of Patent: Nov. 12, 2002

(54) AUTOMATIC WAVE SOLDERING APPARATUS AND METHOD

(75) Inventor: Mitsuo Zen, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 09/796,463

(22) Filed: Mar. 2, 2001

(65) Prior Publication Data

US 2001/0020637 A1 Sep. 13, 2001

(30) Foreign Application Priority Data

Mar. 7, 2000 (JP) ........................................ 2000/061997

(51) Int. Cl.$^7$ .............................. B23K 1/00; B23K 31/02
(52) U.S. Cl. ..................... 228/260; 228/219; 228/180.1; 228/42
(58) Field of Search ................................ 228/260, 219, 228/180.1, 42; 118/421, 423

(56) References Cited

U.S. PATENT DOCUMENTS

| | | | | |
|---|---|---|---|---|
| 4,659,003 A | * | 4/1987 | Simonetti | 118/667 |
| 4,869,418 A | * | 9/1989 | Simpson et al. | 118/423 |
| 5,024,370 A | * | 6/1991 | Yokota | 228/180.1 |
| 5,044,542 A | * | 9/1991 | Deambrosio | 118/421 |
| 5,203,489 A | * | 4/1993 | Gileta et al. | 228/180.1 |
| 5,228,614 A | * | 7/1993 | Elliott et al. | 228/219 |
| 5,409,159 A | * | 4/1995 | Connors et al. | 228/219 |
| 6,116,491 A | * | 9/2000 | Katoh | 228/219 |

FOREIGN PATENT DOCUMENTS

| | | | |
|---|---|---|---|
| EP | 0278166 A2 | * | 8/1988 |
| JP | 58-52899 | | 3/1983 |
| JP | 64-34577 | | 2/1989 |
| JP | 1-59073 | | 12/1989 |
| JP | 4-339563 | | 11/1992 |
| JP | 9-283912 | | 10/1997 |
| JP | 09-283912 A | * | 10/1997 |
| JP | 09-293959 A | * | 11/1997 |
| JP | 9-293959 | | 11/1997 |

* cited by examiner

*Primary Examiner*—Tom Dunn
*Assistant Examiner*—L. Edmondson
(74) *Attorney, Agent, or Firm*—Wenderoth, Lind & Ponack, L.L.P.

(57) ABSTRACT

A wave soldering apparatus includes a solder reservoir adapted to contain molten solder, and a solder nozzle disposed in the solder reservoir and extending up above the molten solder. The nozzle provides a substantially turbulent free solder wave under a printed circuit board while the board is moved in a predetermined path. A tray is pivotably mounted to the nozzle and angularly moved to vary the flow rate of the molten solder. A shroud is mounted adjacent to and associated with the tray to define a contained space into which an inert gas is supplied to provide an inert gas atmosphere. The shroud includes a canopy extending over a portion of the tray. The canopy extends substantially parallel to the predetermined path and is adjustably positioned in response to angular position of the tray to ensure that the board exits from the solder wave within the inert gas atmosphere.

15 Claims, 3 Drawing Sheets

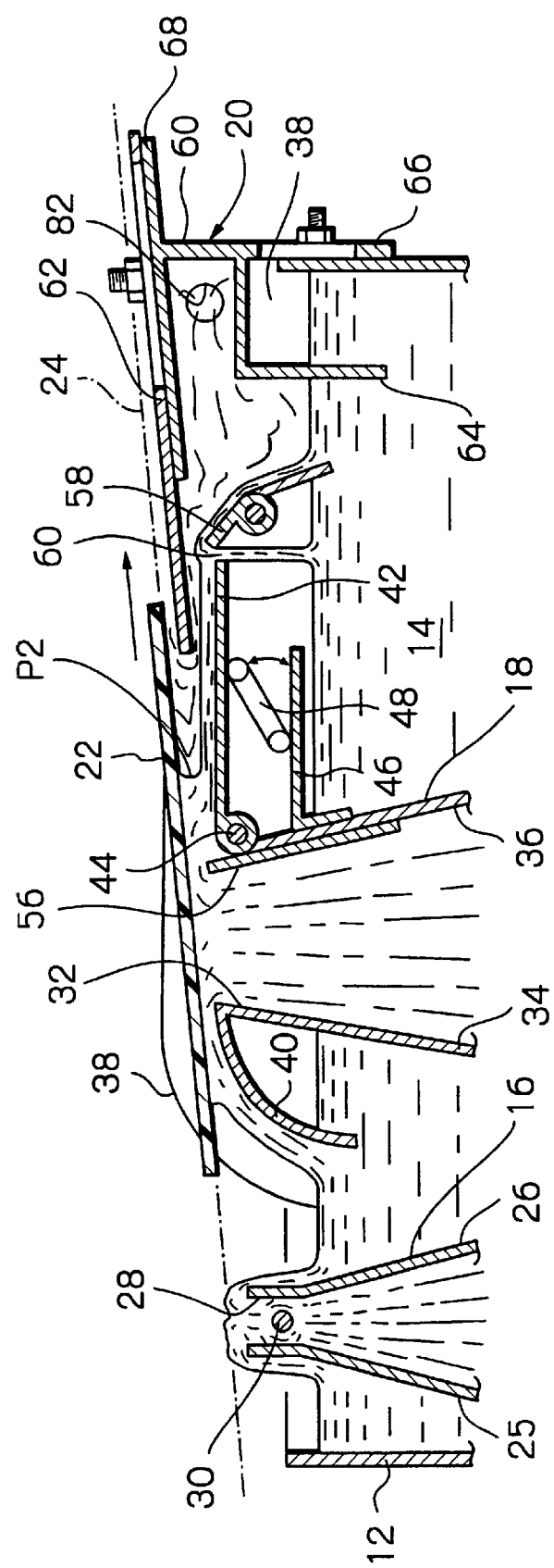

AUTOMATIC WAVE SOLDERING APPARATUS AND METHOD

BACKGROUND OF THE INVENTION

The present invention relates to an apparatus and method for automatically wave soldering workpieces such as printed circuit boards under an insert gas atmosphere.

A conventional automatic wave soldering apparatus typically includes a flux applicator, a preheater, a solder station and a cooling station subsequently arranged to process printed circuit boards. While the printed circuit boards are transported by a conveyor with their side edges supported by gripping fingers, flux is first applied by contacting each circuit board with a foam of flux. Alternatively, flux may be applied to the circuit board by spraying. The fluxed board is preheated by the preheater in order to evaporate excess flux solvent and prevent sudden extreme temperature changes or "heat shock" to the board. The circuit board is then contacted with multiple waves of molten solder. Typically, the solder station includes a relatively narrow nozzle to produce a turbulent wave. This turbulent wave enables the molten solder to fill the gap between leads of electronic components and through holes in the circuit board. However, solder bridges, icicles or excess solder deposits are apt to remain on the underside of the circuit board. To remove such undesirable bridges, a relatively wide nozzle is provided downstream of the narrow nozzle to produce a smooth turbulent free solder wave through which the circuit board passes.

The electronic components are heated to a high temperature when current flows therethrough. On the other hand, the electronic components are cooled to a room temperature in an inoperative state. This thermal cycling causes expansion and contraction of the board as metallic solder and the plastic printed circuit board have different coefficients of thermal expansion. The resulting mechanical stress causes the solder to fracture or peel.

To avoid such solder fracture or fatigue, attempts have been made to deposit a relatively large amount of solder on selected regions of a board to be soldered, as disclosed by Japanese laid-open patent application No. 9-283912. A nozzle is arranged in a solder bath and has a fixed front guide and an adjustable rear guide. A baffle plate is attached to the nozzle near the rear guide. The rear guide is inclined downwards in the direction of movement of a board to thereby form a step between the baffle plate and the rear guide. The molten solder flows at a relatively fast rate after it flows over the baffle plate. This enables a relatively large amount of molten solder to be deposited on selected regions of the circuit board to be wave soldered. However, application of such a large amount of molten solder is apt to form solder bridges, particularly in case that electronic components are packaged with high density. It is, therefore, necessary to adjust the flow rate of molten solder depending on the density of packaged components. This adjustment is made manually, or automatically as disclosed by Japanese laid-open patent application No. 9-293959.

A tin-lead solder has superior wetting characteristics and is conventionally used with RA flux or RMA flux. The use of RA flux minimizes or eliminates the occurrence of bridging regardless of whether solder is applied to high density circuit boards or a large amount of solder is applied. However, RA flux residues are corrosive or hydrolyze to corrosive constituents in the presence of moisture. Those flux residues must therefore be rinsed with chlorine solvent, fluorine solvent, hydrocarbon solvent, terpene solvent or other solvents. All of those solvents are considered to be environmental pollutants. The RMA flux is less corrosive and requires no cleaning after soldering. However, the RMA flux is less active than the RA flux and tends to form solder bridges. The use of a lead-free solder also forms solder bridges since the lead-free solder exhibits a high degree of surface tension and a low degree of wettability.

It has been found that formation of such solder bridges can be avoided if soldering occurs in a substantially oxygen-free atmosphere. Typically, an inert gas is directed to the point, known as "peel back" region, at which a printed circuit board exits from a solder wave. To reduce oxygen content in that region, an inert gas nozzle is placed as close to the peel back region as possible. However, the single use of the inert gas nozzle is not satisfactory since the concentration of oxygen in the peel back region are apt to fluctuate.

Accordingly, it is an object of the present invention to provide an automatic wave soldering apparatus and method which can provide a steady supply of a reduced oxygen atmosphere near the point at which circuit boards exit from a solder wave.

SUMMARY OF THE INVENTION

According to one aspect of the present invention, there is provided an apparatus for wave soldering a workpiece such as a printed circuit board, which comprises a solder reservoir adapted to contain molten solder, and a solder nozzle extending up above the molten solder and arranged to provide a substantially turbulent free solder wave under the workpiece. A tray is pivotably mounted to the downstream side of the solder nozzle. The tray is angularly moved to vary or adjust the rate of flow of the molten solder after the molten solder is pumped up through the solder nozzle. A shroud or enclosure is mounted adjacent to and associated with the tray to define a contained space into which an inert or non-oxidizing gas is supplied to provide an inert or non-oxidizing gas atmosphere. The shroud includes an adjustable canopy extending over a portion of the tray and selectively moved toward and away from the solder nozzle in a direction substantially parallel to the path in which the workpiece is moved. The canopy is adjustably positioned in response to angular position of the tray to ensure that the workpiece exits from the solder wave within the inert gas atmosphere.

The point at which the workpiece exits from the solder wave is referred to in the art as a "peel back region". This peel back region is displaced depending upon the rate of flow of the molten solder. The peel back region should be blanketed with an inert gas atmosphere in all cases; otherwise, solder bridges or icicles are likely to occur. According to the present invention, the tray is angularly moved downwards to increase the rate of flow of the molten solder when a relatively large amount of solder deposits are required. At this time, a peel back region is defined at near the point where the tray is attached to the solder nozzle. It is therefore necessary to position the canopy as close to that point as possible so as to ensure that the peel back region is blanketed with an inert gas atmosphere. As stated above, the canopy extends substantially parallel to and below the path in which the workpiece is moved. This arrangement allows the canopy to position as close to the peel back region as possible. Such close position aids in reducing oxygen content near the peel back region. When a relatively small amount of solder deposits are required, the tray is angularly moved to a horizontal position or slightly upwardly inclined position to decrease the rate of flow of the molten solder. At this time, a peel back region is displaced away from the point at which the tray is attached to the nozzle. To this end, the canopy is moved in a direction away from the nozzle and positioned near the peel back region. This movement of the canopy will not interfere with the position of the tray as the canopy is movable along the path in which the workpiece is moved.

In a preferred embodiment, a baffle may be located at the downstream end of the solder nozzle and associated with the tray to form a step when the tray is oriented in a downwardly inclined position. By this arrangement, the molten solder is caused to drop when it flows over the baffle. This enables the molten solder to flow at a relatively fast rate. To allow angular movement of the tray, a bracket may be secured to the solder nozzle, and a crank may be disposed between the bracket and the tray. The crank may be connected to a motor and driven to cause the tray to rotate in a vertical plane.

In a preferred embodiment, the shroud may include a mount secured to the solder reservoir and shaped to slidably support the canopy thereon. A second solder nozzle may be located upstream of the solder nozzle to provide a turbulent wave under the workpiece. A weir member may be mounted adjacent to the tray and cooperate with the tray to form an opening through which the molten solder flows back to the solder reservoir. The weir member may be selectively rotated toward and away from the tray to vary the degree of opening of the opening.

According to another aspect of the present invention, there is provided a method of wave soldering a workpiece, which comprises the steps of providing a wave soldering apparatus including a solder reservoir within which molten solder is contained, a solder nozzle disposed in the solder reservoir, a tray pivotably mounted to the solder nozzle, and a shroud including an adjustable canopy and associated with the tray to form a contained space, forcing the molten solder through the solder nozzle to generate a substantially turbulent free solder wave under the workpiece while the workpiece is moved in a predetermined path, angularly moving the tray to vary the rate of flow of the molten solder, providing an inert gas atmosphere within the contained space, and adjusting position of the canopy in response to angular position of the tray to ensure that the workpiece exits from the solder wave within the inert gas atmosphere.

Depending on angular position of the tray, the canopy is moved toward and away from the solder nozzle in a direction substantially parallel to the path in which the workpiece is moved. The tray is oriented in a downwardly inclined position so as to increase the flow rate of the molten solder when a relatively large amount of solder deposits are required. When a relatively small amount of solder deposits are required, the tray is oriented in a horizontal position or slightly upwardly inclined position to decrease the flow rate of the molten solder.

BRIEF DESCRIPTION OF THE DRAWINGS

The above and other objects, features and advantages of the present invention will become more apparent from a reading of the following description of preferred embodiments when taken in conjunction with the accompanying drawings, in which:

FIG. 3 is a view similar to that of FIG. 1, but with the tray placed in a substantially horizontal position.

DESCRIPTION OF THE PREFERRED EMBODIMENTS

Figure 1:
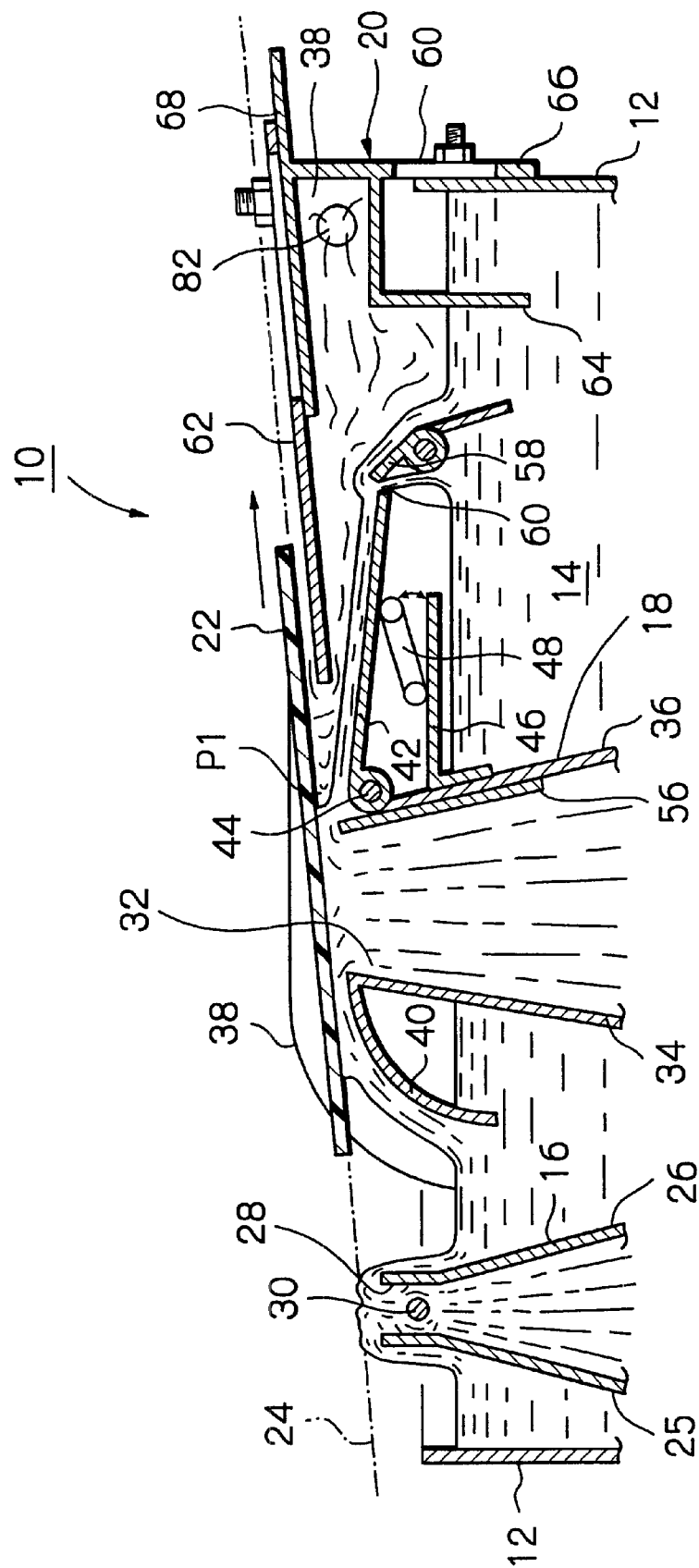
FIG. 1 is a sectional view of one embodiment of an automatic wave soldering apparatus with a tray placed in an downwardly inclined position.

Referring first to FIG. 1, there is shown an automatic wave soldering apparatus according to one embodiment of the present invention and generally designated at 10. The wave soldering apparatus 10 includes a solder reservoir 12 for holding a supply of molten solder 14, first and second solder nozzles 16, 18 for providing solder waves of molten solder, and an shroud 20 for providing an inert gas atmosphere. A printed circuit board 22 is passed along a path 24, shown by broken line in FIG. 1, above the solder reservoir 12. The path 24 is sloped upwards at an angle, for example, of 3 to 5 degrees to the horizontal.

The first solder nozzle 16 includes a pair of upstream and downstream sides or inwardly sloping walls 25, 26, and vertical side walls (not shown) secured to opposite sides of the inwardly sloping walls 25, 26. The first nozzle 16 extends up above the solder level and has a relatively narrow opening 28 through which the molten solder is pumped up to form a solder wave. In the illustrated embodiment, provision is made to generate a turbulent wave. Specifically, a transverse rod or shaft 30 extends below the narrow opening 28 of the first solder nozzle 16. Opposite ends of the rod 30 are supported by springs (not shown). When the molten solder is pumped up through the nozzle opening 28, it flows against the rod 30. This causes the molten solder to flow in a vortex above the rod 30. The rod 30 is first bent upward and then, moved back under the influence of the springs. This up and down motion of the rod 30 creates a turbulent wave. One example of such turbulent means is disclosed in Japanese patent publication No. 1-59073, the content of which is incorporated herein by reference. Illustratively, the turbulent wave is arranged to only contact the underside of the board 22. The turbulent wave promotes the penetration of the molten solder into narrow spaces between electronic components, the filling of through holes in the circuit board, the filling of crevices and corners adjacent solder masks.

Figure 2:
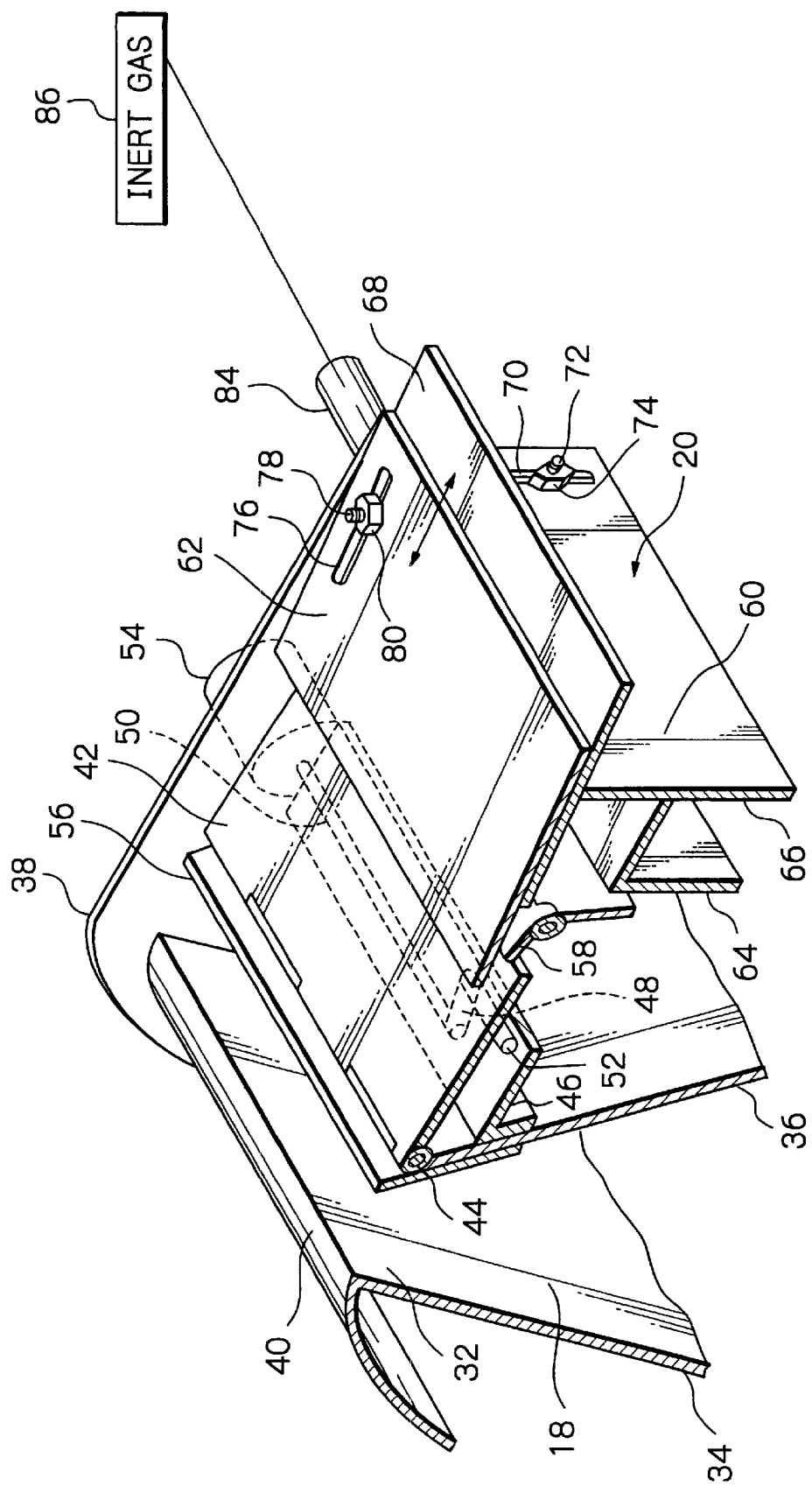
FIG. 2 is an enlarged perspective view of a shroud.

The second solder nozzle 18 is provided downstream of the first nozzle 16 and has a nozzle opening 32 wider than that of the first nozzle 16. The second nozzle 18 also extends up above the solder level and is adapted to provide a smooth turbulent free solder wave. As best shown in FIG. 2, the second nozzle 18 includes a pair of upstream and downstream sides or front and rear inwardly sloping walls 34, 36, and a pair of opposite side walls (only one is shown) 38 secured to the front and rear walls 34, 36. These side walls 38 are also secured to the shroud 20 as will later be described. A front guide 40 extends forwardly and downwardly from the upper end of the front wall 34. An adjustable second guide or substantially flat tray 42 is mounted to the upper end of the rear wall 36 and can be rotated about a horizontal pivot pin 44. A horizontal bracket 46 is secured to the rear side of the rear wall 36 below the tray 42. A crank 48 is disposed between the tray 42 and the bracket 46. The crank 48 has a shaft 50. The shaft 50 has a L-shaped end 52 contacted with the tray 42. The other end of the shaft 50 is connected to a reversible motor 54 which is, in turn, mounted outside the solder reservoir 12. The crank 48 is rotated in directions, as shown by the double-headed arrow in FIG. 1, so as to adjust angular position of the tray 42.

A baffle plate 56 is fixedly attached to the front side of the rear wall 36 and extends up above the pivot pin 44. The baffle plate 56 forms a step when the tray 42 is oriented in a downwardly inclined position as shown in FIG. 1. This step causes the molten solder to drop when it flows over the baffle plate 56. An adjustable weir member 58 is mounted adjacent to the free end of the tray 42 to form an opening 60 through which the molten solder can flow back to the solder reservoir 12. The weir member 58 is connected to a motor (not shown), whereby the weir member 58 is rotated to allow the molten solder to flow at variable flow rates. When the weir member 58 is rotated upwards to block the flow of the molten solder, the molten solder flows at a relatively slow rate. On the other hand, when the weir member 58 is rotated downwards to decrease the size of the opening 60, a significant volumetric portion of the molten solder flows over the weir member 58 at a relatively fast rate. The weir member 58 thus serves as an additional means to adjust the rate of flow of the molten solder.

The shroud 20 is arranged adjacent to and associated with the tray 42 to define a contained space into which an insert gas is supplied to provide an insert gas environment, as will later be described in detail. The shroud 20 generally includes a T-shaped mount 60, an adjustable canopy or shield plate 62, and a skirt 64. T-shaped mount 60 has a vertical plate 66 secured to the rear wall of the solder reservoir 12, and a downwardly sloping plate 68 secured to the top end of the vertical plate 66 and extending substantially parallel to the path 24. The skirt 64 is attached to the front side of the vertical plate 66 and extends down below the level of the molten solder in the reservoir 12. The vertical plate 66 has a vertical slot 70 through which a bolt 72 extends. A nut 74 is threadably engaged with the bolt 72 so as to secure the mount 60 in place. This arrangement allows vertical adjustment of the mount 60 relative to the reservoir 12. The canopy plate 62 extends substantially parallel to and below the path 24 and has a longitudinal slot 76 through which a bolt 78 extends. The bolt 78 is secured to the downwardly sloping plate 68. A nut 80 is threadably engaged with the bolt 78 to secure the canopy plate 62 in place. This arrangement allows longitudinal adjustment of the canopy plate 62 relative to the downwardly sloping plate 68 and thus, the tray 42, as shown by the double-headed arrow in FIG. 2. The side walls 38 are secured to opposite sides of the shroud 20 to provide a seal. A gas inlet 82 is defined in at least one of the side walls 38 and is communicated with a gas pipe 84 (FIG. 2) which is, in turn, connected to a source of inert gas 86. The canopy plate 62 extends over a portion of the tray 42. The shroud 20 and the tray 40 cooperate to form a contained space into which an inert gas is supplied to blanket the solder wave. The gas inlet 82 is located between the canopy plate 62 and the skirt 64 so as to effectively direct an insert gas toward the contained space.

FIG. 1 shows the manner in which a large amount of solder is applied to the underside of the circuit board 22. Specifically, the motor 54 is energized to rotate the crank 48 so as to incline the tray 42 downwards in the direction of movement of the circuit board as shown by the arrow in FIG. 1. A step is thereby formed between the baffle plate 56 and the tray 42. The molten solder is caused to drop when it flows over the baffle plate 56. This enables the molten solder to flow at a relatively fast rate. In this case, a peel back region P1 is defined at a point substantially above the baffle plate 56. The canopy plate 62 is moved as close to the peel back region P1 as possible. At this time, the height of the canopy plate 62 must be so adjusted as to clear the tips of leads or the lowest extremities of exposed metallic surfaces of the circuit board to be wave soldered. An inert gas is introduced into the shroud 20 through the gas inlet 82. The inert gas then flows between the canopy plate 62 and the tray 42 and is directed toward the peel back region P1. The circuit board 22, the tray 42 and the canopy plate 62 cooperate to ensure that a minimum of inert gas escapes from the shroud 20. A substantially oxygen-free atmosphere is thus maintained in the peel back region P1.

FIG. 3 shows the arrangement suitable for applying a relatively small amount of molten solder to printed circuit boards with high density packaging of electronic components. If a large amount of molten solder is applied to such high density circuit boards, bridging of solder between adjacent conductors or metallic surfaces results. To this end, the tray 42 is so positioned as to reduce the rate of flow of molten solder. Specifically, the motor 54 is energized to rotate the crank 48 so as to orient the tray 42 in a substantially horizontal position or slightly upwardly inclined position in the direction of movement of the circuit board 22. Now that the top of the baffle plate 56 is in substantially the same level as the tray 42, the molten solder smoothly flow through the space between the circuit board 22 and the baffle plate 56. This enables the molten solder to flow at a relatively slow rate. In other words, a relatively small amount of molten solder can be applied to the underside of the circuit board. This prevents the occurrence of undesirable bridging. In this case, a peel back region P2 is defined downstream of the peel back region P1. The canopy plate 62 is moved in a direction away from the solder nozzle 18 so that the peel back region P2 is blanketed with an inert gas atmosphere. This also prevents interference of the canopy plate with the tray 42.

Tests were conducted with circuit boards with high density packaging of electronic components as well as circuit boards in which a large amount of solder needed be deposited. The angle of inclination of the tray was varied depending on applications. The canopy plate was longitudinally adjusted accordingly. Flux used was of RMA type. Solder comprised of 63% by weight tin and 37% by weight lead. The results showed no bridging. The concentration of oxygen was less than 500 ppm. Another test was carried out with a lead-free solder and RA flux. The lead-free solder comprised 95.75% by weight tin, 3.5% by weight silver, and 0.75% by weight copper. The test result also showed no formation of bridges or icicles.

An additional test was conducted without shroud. An insert gas was directed to a peel back region by the use of an inert gas nozzle. Bridging resulted in all cases. Also, fillets were formed only at the lower end of leads when the lead-free solder was used. In some instances, molten solder did not sufficiently fill through holes. The concentration of oxygen was over 1,000 ppm.

Although the present invention has been described with respect to its preferred embodiments, it is to be understood that various changes and modifications may be made without departing from the scope of the invention as defined by the appended claims.

What is claimed is:

1. An apparatus for wave soldering a workpiece moved in a predetermined path, said apparatus comprising:

a solder reservoir adapted to contain molten solder;

a solder nozzle disposed in said solder reservoir and extending up above the molten solder, said solder nozzle being arranged to provide a substantially turbulence-free solder wave under the workpiece, said solder nozzle having an upstream side and a downstream side;

an adjustable tray pivotably mounted to said downstream side of said solder nozzle so as to be angularly movable to vary a flow rate of the molten solder;

a gas supply source for providing a supply of inert gas;

a shroud mounted adjacent to and associated with said tray to define a contained space into which the inert gas is supplied to provide an inert gas atmosphere; and a canopy arranged between said tray and said predetermined path of movement of the workpiece, said canopy being adjustably connected to said shroud so as to be movable along a direction substantially parallel to said predetermined path of movement of the workpiece in response to an angular position of said tray to ensure that the workpiece exits from the solder wave within the inert gas atmosphere.

2. The apparatus of claim 1, further comprising a baffle located at said downstream said of said solder nozzle, said baffle being associated with said tray to form a step when said tray is oriented in a downwardly inclined position, whereby the flow rate of the molten solder is increased.

3. The apparatus of claim 1, further comprising a bracket secured to said solder nozzle, and a crank disposed between said bracket and said tray, said crank being operable to rotate said tray in a vertical plane.

4. The apparatus of claim 1, wherein said shroud comprises a mount portion slidably connected to said solder reservoir.

5. The apparatus of claim 4, wherein said mount portion includes a vertical plate secured to said solder reservoir and having a top end, said shroud further comprising a sloping plate secured to said top end of said vertical plate and extending substantially parallel to said predetermined path, said canopy being adjustably connected to said sloping plate.

6. The apparatus of claim 5, wherein said shroud further comprises a skirt secured to said vertical plate and extending down into the molten solder, said skirt being positioned below said gas supply source.

7. The apparatus of claim 1, wherein said solder nozzle comprises a first solder nozzle, further comprising a second solder nozzle located upstream of said first solder nozzle and extending up above the molten solder, said second solder nozzle being arranged to provide a turbulent wave under the workpiece.

8. The apparatus of claim 1, further comprising a weir member mounted adjacent to said tray and cooperating with said tray to form an opening through which the molten solder flows back to said solder reservoir, said weir member being operable to rotate toward and said tray away from said tray to vary the size of said opening.

9. The apparatus of claim 1, wherein said gas supply source comprises a source of inert gas and a gas inlet connected to said source and communicating with said contained space defined by said shroud and said tray.

10. The apparatus of claim 1, further comprising a conveyor extending above said solder reservoir and adapted to move the workpiece along said predetermined path, said conveyor being upwardly inclined at a given angle.

11. A method for wave soldering a workpiece, said method comprising:

providing a wave soldering apparatus, said apparatus comprising a solder reservoir within which molten solder is contained, a solder nozzle disposed in the solder reservoir, a tray pivotably mounted to the solder nozzle, a shroud associated with said tray to form a contained space, and a canopy adjustably connected to said shroud;

forcing the molten solder through the solder nozzle to generate a substantially turbulence-free solder wave under the workpiece while the workpiece is moved along a predetermined path, the canopy being arranged between the tray and the predetermined path of movement of the workpiece;

angularly moving the tray to vary a flow rate of the molten solder;

generating an inert gas atmosphere within the contained space formed by the tray and the shroud; and adjusting a position of the canopy along a direction substantially parallel to the predetermined path of movement of the workpiece in response to an angular position of the tray to ensure that the workpiece exits from the solder wave within the inert gas atmosphere.

12. The method of claim 11, wherein said adjusting the position of the canopy comprises moving the canopy toward and away from the solder nozzle along a direction substantially parallel to the predetermined path.

13. The method of claim 11, wherein said angularly moving the tray comprises orienting the tray in a downwardly inclined position so as to increase the flow rate of the molten solder when a relatively large amount of solder deposits are required.

14. The method of claim 11, wherein said angularly moving the tray comprises orienting the tray in a horizontal position to decrease the flow rate of the molten solder when a relatively small amount of solder deposits are required.

15. The method of claim 11, wherein said angularly moving the tray comprises orienting the tray in a slightly upwardly inclined position to decrease the flow rate of the molten solder when a relatively small amount of solder deposits are required.

* * * * *